United States Patent
Shaik

(10) Patent No.: US 12,371,046 B2
(45) Date of Patent: Jul. 29, 2025

(54) DISPLAYING OBJECTS TO ASSIST A DRIVER IN CONDITIONS OF LOW VISIBILITY

(71) Applicant: FCA US LLC, Auburn Hills, MI (US)

(72) Inventor: Azard Mohammed Shaik, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/389,853

(22) Filed: Dec. 20, 2023

(65) Prior Publication Data

US 2025/0206327 A1    Jun. 26, 2025

(51) Int. Cl.
| | |
|---|---|
| *B60W 50/14* | (2020.01) |
| *B60K 35/23* | (2024.01) |
| *B60K 35/28* | (2024.01) |
| *G06V 10/56* | (2022.01) |
| *G06V 10/60* | (2022.01) |
| *G06V 20/58* | (2022.01) |

(52) U.S. Cl.
CPC ............. *B60W 50/14* (2013.01); *B60K 35/23* (2024.01); *B60K 35/28* (2024.01); *G06V 10/56* (2022.01); *G06V 10/60* (2022.01); *G06V 20/58* (2022.01); *B60K 2360/1868* (2024.01); *B60K 2360/785* (2024.01); *B60W 2050/146* (2013.01); *B60W 2420/403* (2013.01); *B60W 2555/20* (2020.02); *B60W 2556/45* (2020.02)

(58) Field of Classification Search
CPC ............. B60W 50/14; B60W 2556/45; B60W 2555/20; B60W 2050/146; B60W 2420/403; G06V 10/56; G06V 20/58; G06V 10/60; B60K 35/28; B60K 35/23; B60K 2360/785; B60K 2360/1868

See application file for complete search history.

(56) References Cited

U.S. PATENT DOCUMENTS

| | | | | |
|---|---|---|---|---|
| 5,001,558 | A | * | 3/1991 | Burley ................... H04N 23/11 348/E5.09 |
| 5,414,439 | A | * | 5/1995 | Groves .................. H04N 23/23 348/E5.09 |
| 10,257,432 | B2 | * | 4/2019 | Kussel ....................... G06T 5/90 |
| 2003/0095080 | A1 | * | 5/2003 | Colmenarez ........... G06V 20/56 345/7 |
| 2010/0292886 | A1 | * | 11/2010 | Szczerba ............... G01S 13/723 701/31.4 |
| 2015/0310313 | A1 | * | 10/2015 | Murayama ............. B60K 35/00 382/104 |
| 2016/0297365 | A1 | * | 10/2016 | Nix ....................... B60W 30/095 |
| 2017/0038466 | A1 | * | 2/2017 | Salmén ................... G01S 7/497 |

(Continued)

FOREIGN PATENT DOCUMENTS

EP    2512133 B1 *  7/2018    ......... G06K 9/00805

*Primary Examiner* — Chico A Foxx
(74) *Attorney, Agent, or Firm* — Jeremy J. Klobucar

(57) ABSTRACT

In at least some implementations, a method of displaying objects to assist a driver in conditions providing low visibility, includes determining existence of low visibility through a windshield of a vehicle, determining objects present within a predefined area ahead of the vehicle; and displaying one or more graphics in view of a driver of the vehicle, where the one or more graphics are positioned in the view of the driver so that each graphic is indicative of the location of a separate one of the objects determined to be present within the field of view.

19 Claims, 2 Drawing Sheets

(56) References Cited

U.S. PATENT DOCUMENTS

| | | | |
|---|---|---|---|
| 2017/0154226 A1* | 6/2017 | Meis | G05D 1/0257 |
| 2018/0058873 A1* | 3/2018 | Huang | G01C 21/365 |
| 2019/0094136 A1* | 3/2019 | Juette | B60Q 1/08 |
| 2019/0179140 A1* | 6/2019 | Oba | H04N 7/183 |
| 2020/0171951 A1* | 6/2020 | Matsumoto | B60K 35/00 |
| 2022/0139192 A1* | 5/2022 | Stenneth | G08B 27/006 |
| | | | 340/905 |
| 2022/0230456 A1* | 7/2022 | Kasarla | G06V 20/593 |
| 2023/0011331 A1* | 1/2023 | Tsubone | B60K 35/00 |
| 2024/0326788 A1* | 10/2024 | Horiguchi | B60W 30/09 |

\* cited by examiner

DISPLAYING OBJECTS TO ASSIST A DRIVER IN CONDITIONS OF LOW VISIBILITY

FIELD

The present disclosure relates to a method and system for displaying objects to assist a driver in conditions of low visibility.

BACKGROUND

Vehicles are driven in varying conditions which can include instances of low visibility. The instances of low visibility may be caused by environmental factors like precipitation, fog, smoke and the like, as well as objects on the vehicle or blocking a view out of a windshield of the vehicle. Such visibility issues may occur or worsen suddenly and impair safe driving of the vehicle.

SUMMARY

In at least some implementations, a method of displaying objects to assist a driver in conditions providing low visibility, includes determining existence of low visibility through a windshield of a vehicle, determining objects present within a predefined area ahead of the vehicle; and displaying one or more graphics in view of a driver of the vehicle, where the one or more graphics are positioned in the view of the driver so that each graphic is indicative of the location of a separate one of the objects determined to be present within the field of view.

In at least some implementations, the step of displaying is accomplished on a heads-up display provided on the windshield.

In at least some implementations, for each object determined to be present within the field of view, determining an object type and wherein the displayed graphic has a shape indicative of the object type.

In at least some implementations, the method includes determining, for each object determined to be present within the field of view, if the object is moving or stationary. In at least some implementations, the step of displaying is performed as a function of the vehicle speed, vehicle direction of travel and any movement of each object determined to be present within the field of view.

In at least some implementations, the step of determining existence of low visibility is accomplished with one or more forward facing cameras, where forward facing means cameras having a field of view that includes an area in front of the vehicle relative to a fore-aft direction of the vehicle. In at least some implementations, at least one of the one or more forward facing cameras is located within an interior of the vehicle, so that an inner surface of the windshield is between the forward facing camera and an exterior surface of the windshield. In at least some implementations, at least one of the one or more forward facing cameras is used to determine the presence of an object inhibiting a driver's view through the windshield in ambient conditions that do not satisfy a low visibility threshold. In at least some implementations, the presence of an object is determined as a function of a threshold area of a field of view of the one or more forward facing cameras having image data that is outside of a threshold variance from the image data of a sensor not within the interior of the vehicle. In at least some implementations, the threshold used to determine the threshold variance relates to one or both of brightness and color data.

In at least some implementations, the existence of low visibility is determined as a function of brightness detected at one or more sensors. In at least some implementations, the existence of low visibility is determined as a function of a threshold for brightness where the threshold varies as a function of a vehicle speed.

In at least some implementations, the existence of low visibility is determined based upon detection of precipitation over a precipitation threshold, or fog over a fog threshold.

In at least some implementations, information relating to the visibility in an area including the vehicle or an area ahead of the vehicle is received from an external source of visibility information. In at least some implementations, the external source includes weather information or is a visibility sensor that is located remotely from the vehicle.

In at least some implementations, a vehicle includes a windshield including at least a portion adapted to provide a heads-up display, a sensor for one or both of visibility level and object detection, and a graphics display system arranged to display one or more graphics on the heads-up display and including a controller. The controller is communicated with the sensor and the image transmitter, the controller includes a processor and memory with instructions executable by the processor to display the one or more graphics as a function of data from the sensor when the data from the sensor indicates that a visibility through the windshield does not satisfy a visibility threshold.

In at least some implementations, the sensor is mounted within a passenger compartment of the vehicle and has a working area that includes at least a part of the windshield in front of a driver seat of the vehicle. In at least some implementations, the sensor is a camera having a field of view that includes said at least a part of the windshield.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
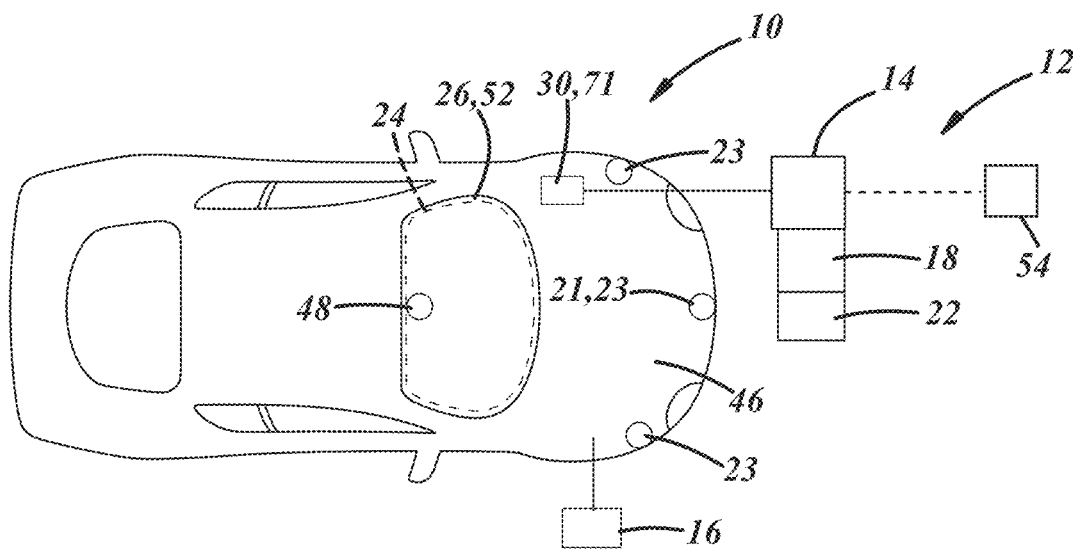
FIG. 1 illustrates a vehicle and diagrammatically illustrates certain vehicle systems and components.

Referring in more detail to the drawings, FIG. 1 illustrates a vehicle 10 which may be of any type and size to transport a driver and optionally one or more passengers or cargo. The vehicle 10 has a control system 12 that may include more than one controller 14 coupled or networked together, a vehicle speed sensor 16 that provides an output indicative of vehicle speed, a navigation system 18 by which navigation data including a path of travel 20 (FIG. 2) may be determined, a location sensor 22 that provides an indication of the location of the vehicle 10, a visibility sensor 21, an object detector or sensor 23 and a display 24 within the vehicle 10 on which information is provided to the driver. For example, information about the vehicle speed, location, path of travel 20 or other information may be provided to the driver to facilitate operation of the vehicle 10 by the driver.

The vehicle 10 may have more than one display by which information is provided to the driver. A display may be part of an instrument panel or dashboard mounted display by which various information is provided to the driver, such as information relating to a Human-Machine Interface (HMI) which enables control of climate controls, radio or other audio systems, vehicle 10 settings and the like. The display 24 may be part of a so-called Heads-Up Display 24 (HUD), where the display 24 may be part of or adjacent to a vehicle windshield 26 located at a front of a passenger compartment of the vehicle 10 and through which a driver looks to see the road and environment in front of the vehicle 10. With a HUD, a driver can see displayed information without having to look away from the road, or with having to only minimally divert their eyes from their normal view through the windshield 26. At least part and up to all of the windshield 26 may be utilized or adapted to be used as a HUD. In this way, the driver can have a larger display and be better able to negotiate obstacles, as discussed herein, and passengers may also be able to determine obstacle location to assist the driver and/or feel safer as the driver controls the vehicle.

The vehicle location sensor 22 may be a GPS component or system and from this sensor, a location of the vehicle 10 can be determined in real-time and/or at a desired intervals or a desired time. The navigation system 18 may determine a path of travel 20 as a function of the intended destination and the vehicle's starting or current location, as determined from the location sensor 22, and may utilize information from the location sensor 22 to enable determination of the position of the vehicle 10 along a desired path of travel 20. In this way, navigation information includes, among other things, a series of navigation instructions, sometimes called turn-by-turn navigation guidance, by which a driver is informed of locations at which the vehicle 10 must be turned, such as form one road to another, along the path of travel 20.

The vehicle speed sensor 16 may be the sensor commonly included with vehicles, and by which a speedometer or real-time vehicle speed is provided on an instrument panel or elsewhere so the driver can be aware of the vehicle speed. The vehicle speed sensor 16 could instead use information from the vehicle location sensor 22 with a rate of change of location used to determine vehicle speed. Both sensors 16, 22 may be used, and the information from both sensors may be compared as a sanity check or other control measure intended to improve the integrity of data or information used.

To facilitate control of the vehicle 10 and display of the information from the various sensors, the vehicle control system 12 is communicated with the sensors by wired or wireless connection. The control system 12 includes at least one controller 14. The control system 12 may be comprised of or include one or more vehicle electronic module(s) installed in the vehicle 10. Each module may include some combination of or access to a data storage unit (e.g. memory), an electronic control unit which may include one or more controllers or processors, and programs or algorithms or instructions stored in the memory/data storage unit. Vehicle electronic module may be a telematics control module (TCM), a body control module (BCM), an infotainment control module 30 (FIG. 1), or any other suitable module. The infotainment control module 30 may control, among other things, instrument panel and other vehicle displays, audio and video inputs and outputs, navigation system, and other components and systems as is known. It is not necessary for the preceding units to be packaged in a single vehicle electronic module, rather, they could be distributed among multiple vehicle electronic modules, they could be stand-alone units, they could be combined or integrated with other units or devices, or they could be provided according to some other configuration. The control system 12 is not limited to any particular architecture, infrastructure or combination of elements.

In order to perform the functions and desired processing set forth herein, as well as the computations therefore, the control system 12 or controller 14 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 14 may include input signal processing and filtering to enable accurate sampling and conversion or acquisitions of such signals from communications interfaces and sensors.

As used herein the terms control system 12 or controller 14 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. Memory, as used herein, can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device or processor(s), and executable programs and algorithms and data and information for these things.

The object detection sensor or object detector 23 may include various sensors which may include various types of cameras, including those operable with visible light and non-visible light like infrared, stereo camera, LIDAR or RADAR or ultrasonic based sensors such as are used by other vehicle systems like automatic braking, lane keeping assistance, Advanced Driver Assistance Systems (ADAS) that provide partial or fully automated driving capabilities, and the like. In this way, the vehicle control system 12 may be capable of controlling one or more drive inputs of the vehicle 10, like steering, accelerating and braking, and may do so for all or part of the vehicle 10 travel along the path of travel, or only for shorter durations, like in crash avoidance or other instances. These object detectors 23 can be part of or communicated with the vehicle control system 12. As used herein, cameras can be considered to be sensors in that the camera includes a sensor responsive to light and from which data can be transmitted for use by the control system 12.

Figure 2:
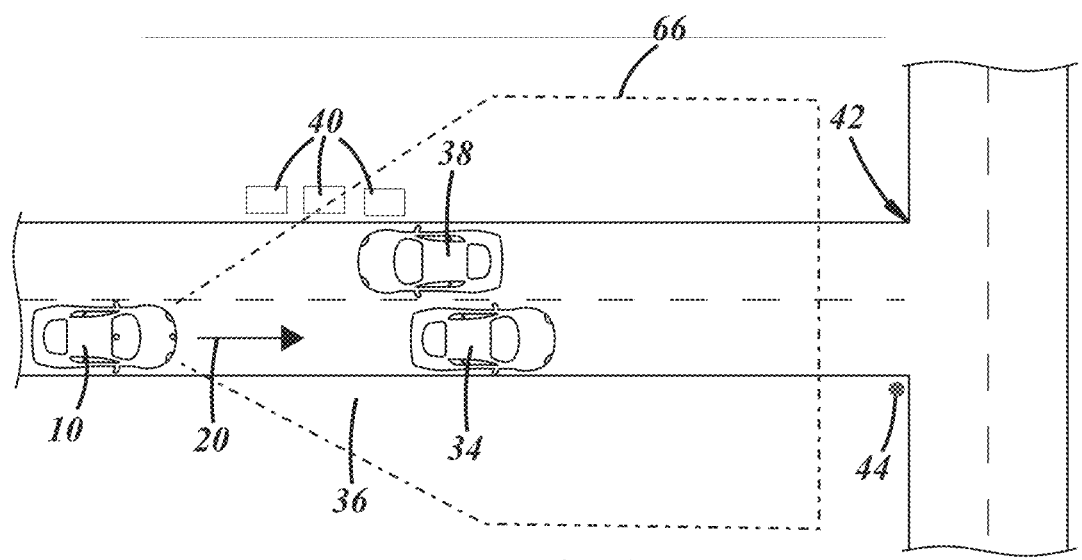
FIG. 2 illustrate the vehicle traveling along a road in an area of low visibility.

An object could be, by way of non-limiting examples, another vehicle, a person, an animal, or any other physical thing detected on or adjacent to a road on which the vehicle 10 is traveling. FIG. 2 shows a second vehicle 34 ahead of the vehicle 10 on a road, a guardrail 36 on an adjacent side of the road, a third vehicle 38 traveling in the opposite direction on the opposite side of the road, and a series of trees or other objects 40 on the opposite side of the road. An object may also include things other than physical objects in the path of travel, such as, but not limited to, navigation obstacles requiring expected turns or change in speed, for example an intersection 42 or traffic sign (e.g. stop sign) 44 or traffic light or merging lane indicator, or a lane closure, etc.

The visibility sensor 21 may be a separate sensor or it may be one or a combination of the object sensors 23 noted herein. The visibility sensor 21 is used to determine an approximate range or level of visibility in the ambient/ surrounding environment/area of the vehicle 10, including but not necessarily limited to the visibility that a driver has looking forward, through the windshield 26 of the vehicle 10. Precipitation, such as rain, sleet, snow and the like, and fog or heavy/thick smoke (e.g. from a forest fire), for example, can impair and limit visibility in the area in which the vehicle 10 is being driven, and can lead to dangerous driving conditions. Representative visibility sensors include transmissometers, forward scatter sensors, and infrared sensors placed, for example, near or on the windshield can be used to detect the low visibility, and as noted herein remote visibility sensors may provide information about visibility to the vehicle.

Solid (i.e. not liquid or gaseous phase) objects that come into contact and remain on the windshield 26 may also block or impair a driver's view through the windshield 26 in ambient conditions that do not satisfy a low visibility threshold or cause visibility concerns. Such objects may include things like paper, plastic, clothing or other debris on or blowing across the road. Objects may also be part of or on other parts of the vehicle and block view through all or part of the windshield 26, like a larger piece of debris that is on and sticking up from the front of the vehicle, or when a vehicle hood 46 (FIG. 1) becomes unlatched and is raised up in front of the windshield 26 during operation of the vehicle 10.

The cause of the limited visibility can initially occur or greatly increase suddenly, and thereafter, safe navigation of the vehicle 10 can be challenging. Examples include road debris that ends up on the vehicle 10 as the vehicle is moving, a sudden increase in the intensity of precipitation or fog, or sudden movement of the vehicle hood 46.

Precipitation may be detected by various sensors 21,23 on the vehicle 10 including one or more sensors having a primary function of detecting precipitation or other sensors that may be used for other purposes as well. An example of a sensor with a primary function of detecting precipitation is a sensor utilized by a windshield 26 wiper system, and they may be based on detecting presence of liquid. Examples of other sensors that may be used to detect precipitation include light or sound transmitting and reflection receiving sensors like LIDAR, RADAR or ultrasonic sensors which may detect a pattern of received reflections that indicate the presence of precipitation within a working range or field of the sensors. For example, the precipitation may scatter light or sound transmissions and provide reflections in a manner detectable as precipitation, and different intensities or levels of precipitation may be recognizable or determinable, where such affect may be within a large part or all of the working range or field of the sensor.

Still other examples include image sensors or cameras, which may be used just for precipitation detection or which may be used for visibility detection and object detection more generally, that provide image data indicative of precipitation. Image data may contain one or more values for areas or pixels of an image, where the values may relate to light levels on a portion of the camera sensor corresponding to the area or pixels. For example, in a RGB image sensor, the data may include three values for each pixel with a first value relating to the red light level, a second to the green light level and a third to the blue light level, with the combination providing a representation of color on a color map. In a black and white image, each pixel or area is either black or white and may have, for example, a value of one or zero. The value or values may also relate to or enable determination of a luminance of areas or pixels of the image data, where luminance is perceived as brightness. Further, the image data may enable determination of light/luminance and/or color contrast among different areas of the image or on average within all of the image data. Such information can be used to determine the presence of precipitation.

Varying rates or intensities of precipitation may also be determined from the data provided by one or more sensors 21, 23. The presence and intensity of fog may be determined by information from similar sensors, for example, where the control system 14 includes or has access to information of different intensities of fog as related or correlated to information from one or more of the sensors used in the vehicle.

The sensors 21, 23 (which again, include may include camera(s)) may be positioned as desired on the vehicle 10. Sensors may be positioned within a passenger compartment of the vehicle, where the ambient environment of the vehicle is detectable through the windshield 26. For example, as shown in FIG. 1, a forward-facing camera 48 or other sensor 21/23 (the camera 48 may act as a visibility sensor 21 and/or object sensor 23) may be positioned on a rearview mirror or on or adjacent to an inner surface 50 (FIG. 3) of the windshield 26 that faces inwardly into and defines a boundary of the passenger compartment. So arranged, the inner surface 50 of the windshield 26 is between the forward-facing camera 48 and an exterior surface 52 (FIG. 1) of the windshield 26. In this way, the camera 48 or other sensor 21/23 can determine the presence of objects on or blocking the view out of the windshield 26. Such objects can include debris, water, snow or the like on the exterior surface 52 of the windshield 26, or debris or a raised vehicle hood or other solid object in front of and blocking view out of the windshield 26 (all or part thereof).

Determination of the objects on or in front of the windshield 26 can be done as a function of the sensor data. As noted, the object(s) may reflect transmissions from the sensor back to the sensor and indicate an object at the distance of the windshield (e.g. indicating the object is on the windshield), or a front end of the vehicle (for example), and/or may detected from image data such as by edge recognition, comparison of luminosity or contrast or color information generally in the image or to determine edges of the object (by way of examples) between data from the interior sensor with one or more exterior sensors. Thus, in at least some implementations, the presence of an object may be determined as a function of a threshold area of a field of view of the one or more forward facing cameras having image data that is outside of a threshold variance from the image data of a sensor not within the interior of the vehicle.

In some implementations, the threshold used to determine the threshold variance relates to one or both of luminance and color. In this way, an object in the field of view or working range/area of an interior camera or sensor, but not within the field of view or working range/area of an exterior camera can, can be identified by the variance in the data from the different sensors. Of course, other methods and systems may be used to determine the presence of an object on the windshield or in or adjacent to the path of travel of the vehicle 10.

In addition to or instead, the information regarding low visibility conditions due to environmental factors may come from one or more visibility information sources that are remote from and not carried by the vehicle 10. For example, weather information can be transmitted to the vehicle from a remote source 54 (e.g. to a vehicle telematics unit) and the weather information can include data regarding precipitation and fog in the area of the vehicle, where the area of the vehicle can be determined from the location sensors and/or navigation system. Further, some areas may include fog or visibility sensors that are dedicated to determining a level or range/distance of at least a threshold level of visibility, and information from these remote sources 54 may be provided to the vehicle control system 14.

Figure 4:
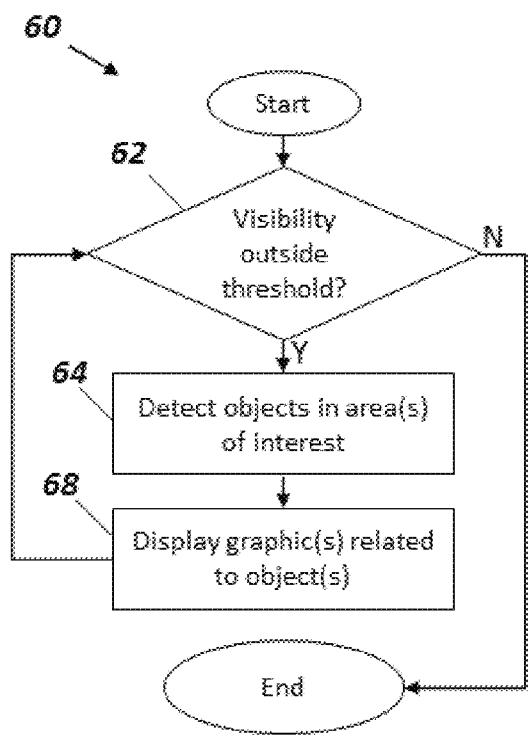
FIG. 4 is a flowchart of a method for displaying graphics to a driver in low visibility driving conditions.

FIG. 4 illustrates a flowchart for a method 60 of displaying objects to assist a driver in conditions providing low visibility. The method 60 may include in step 62 determining the existence of low visibility through a windshield 26 of a vehicle. As noted above, this can be done by the control system 14 using information from one or more sensors 21, 23 and in different ways, and the low visibility can be due to environmental conditions like precipitation and fog, or objects blocking all or part of the view through a windshield 26. The sensors 21, 23 may be part of, carried by the vehicle 10, or they may be from remote sources 54 remotely located from or external to the vehicle with information transmitted to the vehicle, or a combination of such things.

When low visibility has been determined, the method continues to step 64 in which obstacles and other objects present within a predefined area 66 or field of view ahead of the vehicle 10 are detected and/or identified. The predetermined area 66 (FIG. 2) can include an area in the path of travel 20 of the vehicle 10 and some portion of the area adjacent to the path of travel. For example, areas adjacent/to the side of roads, and adjacent lanes of multi-lane roads. Scanning for or determining the presence of obstacles and other objects can be done continuously (e.g. in real-time to the extent permitted by sensor and system processing times) or at short intervals for the duration of the time that the vehicle 10 is determined to be in low visibility conditions. The checking and determining whether low visibility conditions exist can likewise be done repeatedly or continuous, and the method 60 may end when it is determined that the vehicle 10 is operating in an area with visibility above a visibility threshold.

Figure 3:
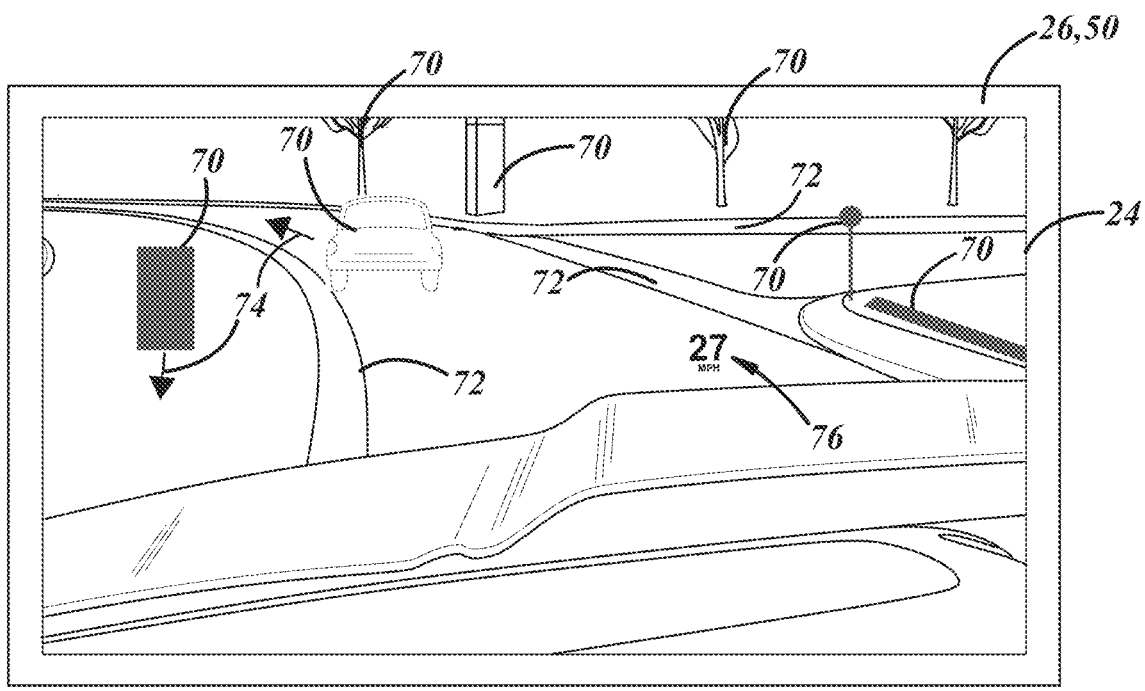
FIG. 3 is a representative view of a Heads-Up Display (HUD) that is part of or on a vehicle windshield, and showing graphics indicative of the road and objects in an area of interest on the road.

When one or more objects are detected in step 64, the method continues to step 68 in which, as shown in FIG. 3, one or more graphics 70 are displayed in view of the driver of the vehicle 10. The one or more graphics 70 may be displayed on a HUD 24 and positioned in the HUD 24 within the view of the driver and so that each graphic 70 is indicative of the location of a separate one of the objects determined to be present within the area 66. The graphic(s) 70 may be displayed by a graphic display system 71 (FIG. 1) which may be part of or communicated with the infotainment system or infotainment control module 30, which may provide displays on/via the HUD 24. The image may be projected onto the HUD 24/windshield 26 and/or provided on or within layers of the windshield in any desired way. The image may also or instead be projected on a display that is separate from the windshield, if desired. While a HUD has advantages of enabling a driver to look in the direction of travel and also view presented information, other displays may be used. Examples of some types of displays include: 1) a combiner glass which may use a partially transparent glass plate mounted on the dashboard or windshield, with images are projected onto the glass using a projector, creating a virtual display; 2) a micro-display having micromirrors or Liquid Crystal on Silicon (LCoS) panels to project images directly onto the windshield; 3) a waveguide that utilizes a special optical material that guides light waves to the driver's eye, with images projected onto the waveguide, creating a virtual display without the need for additional glass or mirrors; or 4) a retinal projection assembly that projects images directly onto the retina, for example, using a laser beam, which may eliminate the need for any external display and can provide highest image clarity and fidelity.

For each object determined to be present within the area 66 of interest, the method 60 may include determining an object type. For example, the object might be another vehicle, a guard rail or curb, a tree, a pedestrian, animal, or a construction sign, barrel, cone, barricade or other. In some implementations, the graphic 70 displayed to the driver may be representative of the type of object detected, and may have a shape indicative of the object type. In some implementations, the graphic 70 size may be a function of a relative size of the detected object and/or distance of the object from the vehicle 10 to facilitate maneuvering the vehicle 10 around or relative to the object. In some implementations, whether detected objects are moving or stationary is determined and the graphics 70 displayed for objects can be moved on the display as a function of this information. Further, indicators of movement can be provided, such as in FIG. 3 which shows arrows 74 for two moving objects, another vehicle in the same lane as the vehicle 10 and an object depicted by a graphic 70 that is a rectangle. FIG. 3 also shows an indicator 76 of vehicle speed (shown as 27 mph) and this and other driving aids may also be provided on the display 24.

In some implementations, the location of roads/road boundaries and navigation obstacles/features/objects may be determined by the one or more sensors and road graphic(s) 72 representing one or more boundaries of the road and road features that comprise navigation obstacles may be displayed along with the object graphic(s) 70. The object graphic(s) 70 can then be arranged relative to their actual position relative to the road and road boundaries and road features (e.g. intersections, merge lanes, lane closures, etc) as depicted on the display 24 by the road graphics 72. This can provide an augmented reality view of things in front of the vehicle, and can create a 3D looking display of such things.

In some implementations, the method 60 includes determining the speed of the vehicle 10 and the step of displaying the graphic(s) 70, 72 is performed as a function of one or more of the vehicle speed, vehicle direction of travel and any movement of each object determined to be present within the area 66 of interest. The vehicle 10 will encounter obstacles and other objects sooner and the vehicle will need more time to stop or otherwise maneuver around or relative to various objects when the vehicle is traveling at a higher speed. Further, the threshold for visibility can be set lower when the vehicle is traveling at higher speeds as visibility impairment due to precipitation, fog, smoke and the like is worse at higher vehicle speeds relative to these things and visibility is greater at lower vehicle speeds relative to these things. In some implementations, the existence of low visibility is determined as a function of a level of luminance detected at one or more sensors, and the existence of low visibility may be determined as a function of a threshold for luminance in sensor data where the threshold varies as a function of a vehicle speed. In this way, a lower threshold for visibility impairment may be needed to cause the system to display graphic(s) 70, 72 on the HUD to assist the driver at higher vehicle speeds than at lower vehicle speeds, as driving slower improves visibility in environmentally challenging conditions (e.g. precipitation, fog, smoke). Ambient light levels may also be a factor by which thresholds are established or adjusted, with lower ambient light levels combined with another visibility impairment, like precipitation or fog, causing the threshold to be lower to enable or cause display of the graphics 70, 72 more readily than with higher ambient light levels.

With regard to a solid object blocking all or part of the view through the windshield 26, the visibility threshold may simply be detection of such an object or not, and without regard to vehicle speed, direction or other factors, in at least some implementations. With regard to the direction of travel, whether an object is moving toward the vehicle or away from the vehicle will affect the need or benefit of displaying a graphic for that object, and navigation obstacles will be dependent upon the vehicle direction of travel, for example.

As noted herein, in some implementations, different thresholds may be used for different visibility impairing conditions. For example, in some implementations, the existence of low visibility is determined based upon detection of precipitation over a precipitation threshold, or fog over a fog threshold, etc. Further, different thresholds may be used for different types of precipitation (e.g. rain or snow or sleet).

The features noted herein can be used in various combinations unless specifically contrary to each other, and various other modifications can be made within the scope of this disclosure. For example, via a user interface, such as the infotainment system, the user may be prompted to accept or decline the display of graphics 70, 72, and the user may prompt the control system 12 to display graphics 70, 72 at a time when the control system 12 has not determined to do so. This may permit a user to control when the graphics 70, 72 are provided and to avoid distraction in situations where the user believes visibility is sufficient to navigate the vehicle 10. Further, the control system 12 may include machine learning programs or algorithms by which the system may learn user preferences for when the graphics 70, 72 should and should not be displayed, based on user interaction with the system. In this way, the control system 12 may adjust the thresholds for low visibility in different circumstances and for different reasons in accordance with user actions over time.

How to determine visibility for vehicles (e.g. planes, automobiles) is known in various arts, and is not the specific subject of this disclosure except to the extent noted herein. This disclosure relates, in part, to providing a display to a driver of objects that are in or define a path of travel 20 of the vehicle and in an area of interest 66 including the path of travel 20, to assist the driver in navigating the vehicle 10 in low to no visibility conditions. In at least some implementations, the system is not intended for a driver to continue to drive in such poor conditions, but rather, to enable a driver to safely navigate the vehicle to a safe location where the vehicle is clear of obstacles and other vehicles on the road, and so that the driver can wait for conditions to improve, or the driver can remove or resolve a visibility impairing object on the vehicle.

As used herein, the road or other path of travel surface, navigation features/obstacles and other obstacles may all be considered "objects". Accordingly, the display of graphics may relate to, by way of some examples, objects (e.g. the road and road boundaries) used to guide the vehicle along a path of travel and/or to a safe area, and to objects that the vehicle should be steered or otherwise controlled to avoid to avoid a vehicle collision with such objects/obstacles.

What is claimed is:

1. A method of displaying objects to assist a driver in conditions providing low visibility, comprising:
   determining existence of low visibility through a windshield of a vehicle;
   determining objects present within a predefined area ahead of the vehicle;
   displaying one or more graphics in view of a driver of the vehicle, where the one or more graphics are positioned in the view of the driver so that each graphic is indicative of the location of a separate one of the objects determined to be present within the field of view; and
   a forward facing camera located within an interior of the vehicle, so that an inner surface of the windshield is between the forward facing camera and an exterior surface of the windshield, wherein the forward facing camera is used to determine the presence of a view blocking object inhibiting a driver's view of the area beyond the windshield in ambient conditions that do not satisfy a low visibility threshold.

2. The method of claim 1 wherein the step of displaying is accomplished on a heads-up display provided on the windshield.

3. The method of claim 1 which also comprises, for each object determined to be present within the field of view, determining an object type and wherein the displayed graphic has a shape indicative of the object type.

4. The method of claim 1 which also comprises determining, for each object determined to be present within the field of view, if the object is moving or stationary.

5. The method of claim 4 wherein the step of displaying is performed as a function of the vehicle speed, vehicle direction of travel and any movement of each object determined to be present within the field of view.

6. The method of claim 1 wherein the step of determining existence of low visibility is accomplished with the forward facing camera or with one or more other forward facing cameras, where forward facing means cameras having a field of view that includes an area in front of the vehicle relative to a fore-aft direction of the vehicle.

7. The method of claim 6 wherein at least one of the one or more forward facing cameras is located within an interior of the vehicle, so that an inner surface of the windshield is between the forward facing camera and an exterior surface of the windshield.

8. The method of claim 1 wherein the presence of the view blocking object is determined as a function of a threshold area of a field of view of the one or more forward facing cameras having image data that is outside of a threshold variance from image data of a sensor not within the interior of the vehicle.

9. The method of claim 8 wherein the threshold variance relates to one or both of brightness and color data.

10. The method of claim 1 wherein the existence of low visibility is determined as a function of brightness detected at one or more sensors.

11. The method of claim 10 wherein the existence of low visibility is determined as a function of a threshold for brightness where the threshold varies as a function of a vehicle speed.

12. The method of claim 1 wherein the existence of low visibility is determined based upon detection of precipitation over a precipitation threshold, or fog over a fog threshold.

13. The method of claim 1 wherein the step of determining the existence of low visibility is accomplished with one or both of a transmissometer or a forward scatter sensor.

14. A method of displaying objects to assist a driver in conditions providing low visibility, comprising:
determining existence of low visibility through a windshield of a vehicle;
determining objects present within a predefined area ahead of the vehicle;
displaying one or more graphics in view of a driver of the vehicle, where the one or more graphics are positioned in the view of the driver so that each graphic is indicative of the location of a separate one of the objects determined to be present within the field of view, wherein information relating to the visibility in an area including the vehicle or an area ahead of the vehicle is received from an external source of visibility information that is located remotely from the vehicle, and is used in the step of determining existence of low visibility.

15. The method of claim 14 wherein the external source includes weather information or is a visibility sensor.

16. A vehicle, comprising:
a windshield including at least a portion adapted to provide a heads-up display;
a sensor for one or both of visibility detection and object detection;
a forward facing camera located within an interior of the vehicle and having a field of view that includes an area outside the windshield and in front of the vehicle relative to a fore-aft direction of the vehicle;
a graphics display system arranged to display one or more graphics on the heads-up display and including a controller, wherein the controller is communicated with the sensor and the forward facing camera the controller includes a processor and memory with instructions executable by the processor to display the one or more graphics as a function of data from the sensor when the data from the sensor indicates that a visibility through the windshield does not satisfy a visibility threshold, and wherein the controller is operable to determine, based at least in part on image data from the forward facing camera, when an object is on the windshield or a front of the vehicle that inhibits a driver's view of the area beyond the windshield in ambient conditions that do not satisfy a low visibility threshold.

17. The system of claim 16 wherein the sensor is mounted within a passenger compartment of the vehicle and has a working area that includes at least a part of the windshield in front of a driver seat of the vehicle.

18. The system of claim 17 wherein the sensor is a camera having a field of view that includes said at least a part of the windshield.

19. The system of claim 16 wherein the sensor is a transmissometer or a forward scatter sensor.

* * * * *